(12) United States Patent
Kato et al.

(10) Patent No.: US 8,161,827 B2
(45) Date of Patent: Apr. 24, 2012

(54) TORQUE MEASURING APPARATUS AND ACTUATOR DRIVE CONTROL SYSTEM

(75) Inventors: Keisuke Kato, Tokyo (JP); Kenichiro Nagasaka, Tokyo (JP)

(73) Assignee: Sony Corporation, Tokyo (JP)

( * ) Notice: Subject to any disclaimer, the term of this patent is extended or adjusted under 35 U.S.C. 154(b) by 302 days.

(21) Appl. No.: 12/472,555

(22) Filed: May 27, 2009

(65) Prior Publication Data

US 2010/0005907 A1    Jan. 14, 2010

(30) Foreign Application Priority Data

May 30, 2008  (JP) ................. P2008-143763

(51) Int. Cl.
*G01L 1/22* (2006.01)
(52) U.S. Cl. .................................. 73/862.044
(58) Field of Classification Search ............. 73/862.043, 73/862.044, 862.326
See application file for complete search history.

(56) References Cited

U.S. PATENT DOCUMENTS 3,481,192 A * 12/1969 Herzog et al. ........... 73/862.045
5,315,882 A * 5/1994 Meyer et al. ............... 73/862.44
6,269,702 B1 * 8/2001 Lambson ................. 73/862.045
6,694,828 B1 * 2/2004 Nicot ....................... 73/862.326

FOREIGN PATENT DOCUMENTS

| JP | 57-169643 | 10/1982 |
|----|-----------|---------|
| JP | 5-223665 | 8/1993 |
| JP | 08-327472 | 12/1996 |
| JP | 09-138168 | 5/1997 |
| JP | 2005-121603 | 5/2005 |
| JP | 2007-155576 | 6/2007 |
| JP | 2008-076161 | 4/2008 |
| WO | WO 2005-075950 A1 | 8/2005 |

* cited by examiner

*Primary Examiner* — Lisa Caputo
*Assistant Examiner* — Octavia Davis-Hollington
(74) *Attorney, Agent, or Firm* — Finnegan, Henderson, Farabow, Garrett & Dunner, L.L.P.

(57) ABSTRACT

A torque measuring apparatus includes: a flexure element that is attached between an output shaft of an actuator or a speed reducer as a torque measurement object and a load object, and includes a main flexure part displaced mainly around the output shaft according to a torque applied from the load object, and an auxiliary flexure part to remove a displacement component other than the displacement of the main flexure part around the output shaft; and at least one pair of strain gauges attached to the main flexure part. The torque is measured based on electric signals outputted from the respective strain gauges.

15 Claims, 7 Drawing Sheets

INNER RING

MAIN FLEXURE PART

OUTER RING

APPLIED VOLTAGE $V_{cc}$

SENSOR OUTPUT VOLTAGE $V_{out}$

INITIAL STATE

STRAIN GAGE
FIXED PART (FLEX SPLINE)
INPUT SHAFT (WAVE GENERATOR)
OUTPUT SHAFT (CIRCULAR SPLINE)
FLEX SPLINE AND CROSS ROLLER BEARING ARE INCORPORATED

OUTPUT SHAFT
ACTUATOR
FLEXURE ELEMENT
BASE

PRIOR ART

TORQUE MEASURING APPARATUS AND ACTUATOR DRIVE CONTROL SYSTEM

BACKGROUND OF THE INVENTION

1. Field of the Invention

The present invention relates to a torque measuring apparatus attached to an output shaft of, for example, an actuator motor and to measure a torque applied to the output shaft and an actuator drive control system, and particularly to a torque measuring apparatus in which strain gauges are bonded to a flexure element to generate strain by the application of torque and the torque is measured based on output signals of the strain gauges, and an actuator drive control system.

2. Description of the Related Art

A torque sensor is studied and developed from long ago. The torque sensor is used for a drive system of, for example, an actuator control apparatus of force control system, or "haptic device" for providing the sense of force or the sense of touch to the operator in addition to visual information and aural information. Here, the force control is a control method in which a target value of force to be applied to a working object is directly received, and the force represented by the target value is realized. The output torque is detected more accurately and feedback is performed, so that a more flexible interpersonal physical interaction service in force order becomes possible. The main application of the haptic device is to learn a specific technique in medicine or others, or to provide the three-dimensional sense of force and sense of touch on a material in an environment in which it cannot be actually touched, such as in remote control working in a virtual environment such as small cosmos or ocean, or in a specific or dangerous environment such as a nuclear reactor. The output torque is detected more accurately and the feedback is performed, so that the feeling obtained when the material in the virtual environment is touched or grasped can be realistically provided to the user through the haptic device.

FIG. 16 shows a general structural example for measuring the output torque of an actuator motor. In the illustrated example, a coupling is disposed between an output shaft of the actuator through a speed reducer and a load object (not shown), and a pair of strain gauges are bonded to the cylindrical surface of the coupling in such a way that each of them is deflected by 45 degrees with respect to the rotation axis direction (that is, they draw approximately a letter X). When the coupling is deformed by load torque applied to the output shaft, the electric resistance values of the strain gauges united with the coupling are also changed due to the deformation. Accordingly, the deformation amount of the coupling, that is, the applied torque can be obtained in accordance with the combination of the change amounts of inter-terminal voltages of the respective strain gauges. Besides, when the output shaft is rotated infinitely like a general rotation transmission system, it is sufficient if the torque is measured from the outside through a contact such as a slip ring.

A harmonic drive speed reducer typified by "Harmonic Drive (registered trademark)" of Harmonic Drive Systems Inc. includes a wave generator as an actuator input, a circular spline as an output shaft, and a flex spline at a fixed side (supporting counter torque). In the accurate power transmission system as stated above, when torque measurement is performed using strain gauges, as shown in FIG. 17, plural pairs of strain gauges are coaxially bonded to a member to fix the circular spline, and the torque can be measured based on the change of electric signals corresponding to the change amounts of the respective strain gauges. When attention is paid to the harmonic drive speed reducer, since the strain of the member constituting the flex spline is observed, the counter torque is measured. Since the strain gauge itself is a sensitive sensor, it can be said that the characteristic of the harmonic drive speed reducer determines the accuracy of the torque measuring method. Besides, the periodically undulated deformation is smoothened by using the plural pairs of strain gauges, and the effect of extracting only the deformation due to the torque around the output shaft can be expected.

As shown in FIG. 18, a float differential torque measuring apparatus has a structure in which an output shaft of a motor with a speed reducer is supported from the outside by bearings and can be freely rotated (see, for example, Cowritten by Hirose and Kato, "Development of Float Differential Torque Sensor" (Abstracts for meeting of the Japan Society of Mechanical Engineers, Robotics and Mechatronics, ICI2-6, 1998) (non-patent document 1)). The outside is supported by an elastic beam, and when torque is applied to the output shaft, counter torque is applied through the passage of output shaft→speed reducer→motor rotator→motor stator→casing→beam. The characteristic of the beam is adjusted according to the measuring method, and a strain gauge can be used. In the illustrated apparatus, the beam is twisted by the counter torque, and an auxiliary beam is used to absorb the displacement of the beam in the axial direction. At least two sets of beams are provided, the strain gauge is disposed on each of them, and wire connection is performed to cancel strain other than strain due to the torque.

Since the float differential torque measuring apparatus measures the counter torque even in the state where the backdrivability of the speed reducer is very low, there is a merit that the torque measurement is possible. However, when the motor is a measuring object, since the measurement of the torque is performed through the passage of load→speed reducer→rotator→gap→stator→beam, the repulsive force between the rotator and the stator is merely measured. For example, even if an impulse force is exerted on the load side, it is merely transmitted as the repulsive force to the sensor through the electromagnetic system, a signal of high frequency cannot be detected.

On the other hand, a torque measuring method can be mentioned, which uses a characteristic that a motor drive current and an output torque are almost uniquely determined. In recent years, an inexpensive and highly sensitive current measuring device such as a Hall device can be used. There is often adopted such a structure that the Hall device is disposed at the output stage of a motor drive circuit, and current control, that is, torque control is performed. However, since not only the characteristic of a load, but also the characteristics of a halfway transmission system, a speed reducer and the like are also included, it is difficult to perform accurate force (torque) control to the object. Besides, it is conceivable that a dead zone and nonlinearlity due to friction and hysteresis occurs, the sensor value includes these, and the characteristic of the sensor system is remarkably reduced. Although the nonlinearlity is not fatal, the dead zone causes a minute component to be unable to be detected, the reproducibility of the hysteresis is lost, and the accuracy is impaired.

Besides, as a general torque measuring method, a flexure element to generate strain by the application of torque is attached to an output shaft of an actuator motor, strain gauges are bonded to specified parts of the flexure element, and the torque is calculated based on electric signals outputted from the respective strain gauges.

For example, there is proposed a load sensor which includes a flexure element to generate strain by a load, and a detection element disposed on the flexure element and having a detection value changed according to the strain, and in which the strain of the flexure element deformed in the rotation axis direction of a brake disk is detected according to a brake torque to brake the rotation of the brake disk (see, for example, JP-A-2008-76161 (patent document 1)).

Besides, there is proposed a torque sensor which is directly provided on the outside surface of a cylindrical flexure element, and in which a stress due to a torsion torque generated in the flexure element is directly transmitted to a first compression strain resistance element, a second compression strain resistance element, a first tensile strain resistance element, and a second tensile strain resistance element (see, for example, JP-A-2007-155576 (patent document 2)).

Besides, there is proposed a torque detector in which a torque to be detected is applied to a flexure element of a strain gauge through an elastic body, and breakage of the flexure element, and peeling of a resistance body are prevented (see, for example, JP-A-9-138168 (patent document 3)).

Besides, there is proposed a low cost torque sensor in which a flexure element deformed by relative rotation displacement to move a slider in an axial line direction is used, and a dead zone is not generated (see, for example, JP-A-8-327472 (patent document 4)).

The strain gauge is a device whose electric resistance value is almost linearly changed according to the strain amount, and is known as a sensitive sensor (described before). Accordingly, the present inventors consider that a torque measuring apparatus with higher accuracy can be constructed when a flexure element to generate strain only in a direction in which a torque is applied (in other words, the generation of strain in a direction other than an expected direction can be suppressed) is attached to an output shaft of an actuator motor, and strain gauges are bonded to the surface of the flexure element as stated above. That is, since the torque is the moment of a force around a rotation shaft, the flexure element has a part mainly displaced around the rotation shaft according to the torque, and when the strain gauges are bonded to the part, the torque could be measured at high accuracy based on electric signals outputted from the strain gauges.

SUMMARY OF THE INVENTION

It is desirable to provide an excellent torque measuring apparatus in which strain gauges are bonded to a flexure element to generate strain by the application of torque, and the torque can be appropriately measured based on output signals of the strain gauges, and an actuator drive control system.

Besides, it is desirable to provide an excellent torque measuring apparatus in which strain gauges are bonded to such a flexure element that the generation of strain in a direction other than an expected direction according to a torque is suppressed, and the torque can be measured with high accuracy based on output signals of the strain gauges, and an actuator drive control system.

Besides, it is desirable to provide an excellent torque measuring apparatus in which strain gauges are bonded to a part of a flexure element which is mainly displaced around a rotation shaft according to a torque, and the torque can be measured with high accuracy based on electric signals outputted from the strain gauges, and an actuator drive control system.

According to an embodiment of the present invention, there is provided a torque measuring apparatus including a flexure element that is attached between an output shaft of an actuator or a speed reducer as a torque measurement object and a load object, and includes a main flexure part displaced mainly around the output shaft according to a torque applied from the load object, and an auxiliary flexure part to remove a displacement component other than the displacement of the main flexure part around the output shaft, and at least one pair of strain gauges attached to the main flexure part, wherein the torque is measured based on electric signals outputted from the respective strain gauges.

As a general torque measuring method, a flexure element to generate strain by the application of torque is attached to an output shaft of an actuator motor, strain gauges are bonded to specified parts of the flexure element, and the torque is measured based on electric signals outputted from the strain gauges. The flexure element here is defined as "mechanical sensor in which a structural member is made flexible to a certain degree and which measures a force (torque) from the degree of displacement thereof."

The strain gauge is a device whose electric resistance value is almost linearly changed according to the strain amount, and is known as a sensitive sensor (described before). Accordingly, it is conceivable that the torque measuring apparatus with higher accuracy can be constructed when the flexure element to generate strain only in the direction in which the torque is applied (in other words, the generation of strain in a direction other than the expected direction can be suppressed) is attached to the output shaft of the actuator motor, and the strain gauges are bonded to the surface of the flexure element as stated above.

In the torque measuring apparatus of the embodiment of the invention, the flexure element attached between the output shaft of the actuator or the speed reducer as the torque measurement object and the load object includes the main flexure part mainly displaced around the rotation shaft according to the torque. The flexure element includes the auxiliary flexure part disposed to be adjacent to the main flexure part and to remove the displacement component other than the displacement of the main flexure part around the output shaft. Thus, the main flexure part can be kept so as not to generate strain in a direction other than an expected direction. At least one pair of strain gauges are bonded to the main flexure part as stated above, and the torque can be measured with higher accuracy and higher sensibility based on the electric signals outputted from the strain gauges.

The auxiliary flexure part is disposed at, for example, at least one end of the main flexure part, and when the main flexure part causes a minute deformation by the application of torque, the auxiliary strain member itself is deformed, and functions to remove the displacement component other than the displacement around the output shaft of the main flexure part.

The flexure element includes, for example, an inner ring fixed to the output shaft of the actuator or the speed reducer, an outer ring to which a load torque is applied or which outputs a torque, and plural beams to connect both the rings at plural places so that the inner ring and the outer ring become almost concentric with each other, and at least a part of the beams becomes the main flexure part to which the strain gauges are attached. The auxiliary flexure part is formed at an end of the main flexure part on one of the outer ring side and the inner ring side. When the main flexure part causes the minute deformation due to the application of torque at the outside, the auxiliary strain part itself is also deformed, and removes the displacement component other than the displacement around the output shaft of the main flexure part.

In the torque measuring apparatus of the embodiment of the invention, for example, torque measurement is performed by a four-gage method. Here, the flexure element is constructed so that a pair of main flexure parts are opposite to each other across the output shaft, and a pair of strain gauges are bonded to both sides of each of the main flexure parts directed to the rotation direction of the output shaft. In such a case, even if the beam is extended due to a problem such as eccentricity of the output shaft, the influence can be cancelled.

Further, the torque measuring apparatus is designed so that the initial resistance values of the respective strain gauges are almost uniform, the strain gauges arranged diagonally across the output shaft exhibit similar behaviors, and the absolute values of changes are the same in the strain gauges opposite to each other across the main flexure part. Consequently, the electric signal proportional to the applied torque can be obtained as the sensor output.

According to the embodiment of the invention, there can be provided the excellent torque measuring apparatus in which the strain gauges are bonded to the flexure element to generate the strain by the application of torque and the torque is measured based on the output signals of the strain gauges, and the actuator drive control system.

Besides, according to the embodiment of the invention, there can be provided the excellent torque measuring apparatus in which the strain gauges are bonded to such a flexure element that the generation of strain in a direction other than the expected direction according to the torque is suppressed, and the torque can be measured with high accuracy based on the output signals of the strain gauges, and the actuator drive control system.

In the torque measuring apparatus of the embodiment of the invention, since the measurement is performed at the side closer to the load than the actuator or the speed reducer, the characteristic of the load itself is easily measured. In other words, the influence of the components of the drive mechanism is suppressed, and the highly sensitive torque measurement can be realized, and by this, a signal of high band can also be sufficiently measured.

By the torque control, the control characteristic of the actuator can be improved such that the target value of a force to be applied to a working object is directly received, and the force represented by the target value is realized. However, when the performance of the sensor system or the drive control system is not sufficient, the system may become a very dangerous system. According to the embodiment of the invention, since the simple and high accuracy sensor system can be formed, detection of an overload or the like is easy, and the safe torque control system can be realized while the control characteristic of the actuator is improved.

Since the torque measuring apparatus of the embodiment of the invention is basically constructed by bonding plural pairs of strain gauges to the specified parts of the flexure element having a high degree of design freedom, a compact mechanical system can be designed for an introduction object such as the output shaft of the actuator or the speed reducer. Especially, since the whole length of the actuator drive control system in the rotation axis direction can be suppressed to be short, when it is applied to, for example, an arm robot, it can be disposed as an actuator unit of a joint section as it is.

Further features and merits of the invention will be apparent by a more detailed description based on after-mentioned embodiments and accompanying drawings.

DETAILED DESCRIPTION OF EMBODIMENT

Hereinafter, an embodiment of the invention will be described in detail with reference to the drawings.

Figure 1:
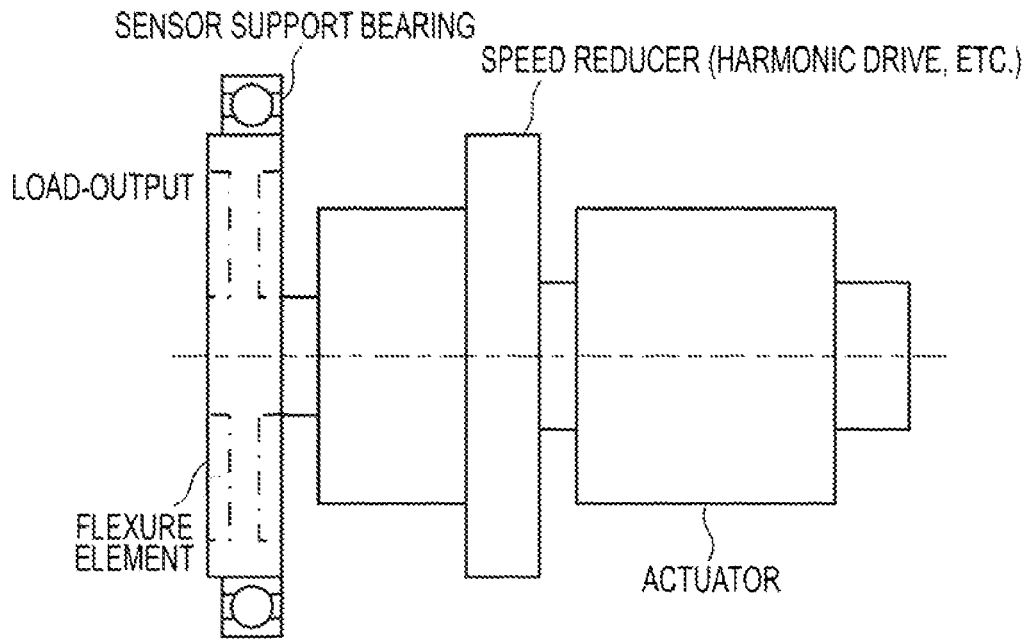
FIG. 1 is a view schematically showing a structure of a drive control system including an actuator to which an embodiment of the invention can be applied and peripheral devices attendant on this.

FIG. 1 schematically shows a structure of a drive control system including an actuator to which an embodiment of the invention can be applied and peripheral devices attendant on this. The illustrated drive control system is roughly divided into three modules of an actuator including a motor and the like, a speed reducer and a torque sensor, and can be called "actuator unit with speed reducer having torque measurement function". That is, the drive control system can measure torque applied to the output shaft of the actuator unit having the speed reducer, and can perform torque control of the actuator.

As is well known in this industry, an actuator and a speed reducer include various elements, such as hysteresis, friction, and nonlinearity, which cause model identification to become difficult. As described later in detail, the torque sensor used in the embodiment is mainly attached to the output shaft of the speed reducer excellent in backdrivability, so that more excellent characteristics can be obtained. An example of the speed reducer excellent in the backdrivability is a harmonic drive speed reducer typified by Harmonic Drive (registered trademark).

Of course, the torque sensor used in this embodiment can be sufficiently used for the output shaft of a speed reducer poor in the backdrivability. Alternatively, it should be understood that the torque sensor of the embodiment can be used for a drive apparatus using a speed reducer, such as a direct drive motor, which can output sufficient torque by a single motor.

The torque sensor is constructed as a flexure element in which at least one pair of strain gauges are attached, and as shown in FIG. 1, the torque sensor is attached at the output shaft side of the speed reducer through sensor support bearings In order to suppress the whole length (size in the motor rotation axis direction) of the actuator unit to be short, it is desirable that the flexure element has, for example, a disk shape or a short cylindrical shape.

Figure 2:
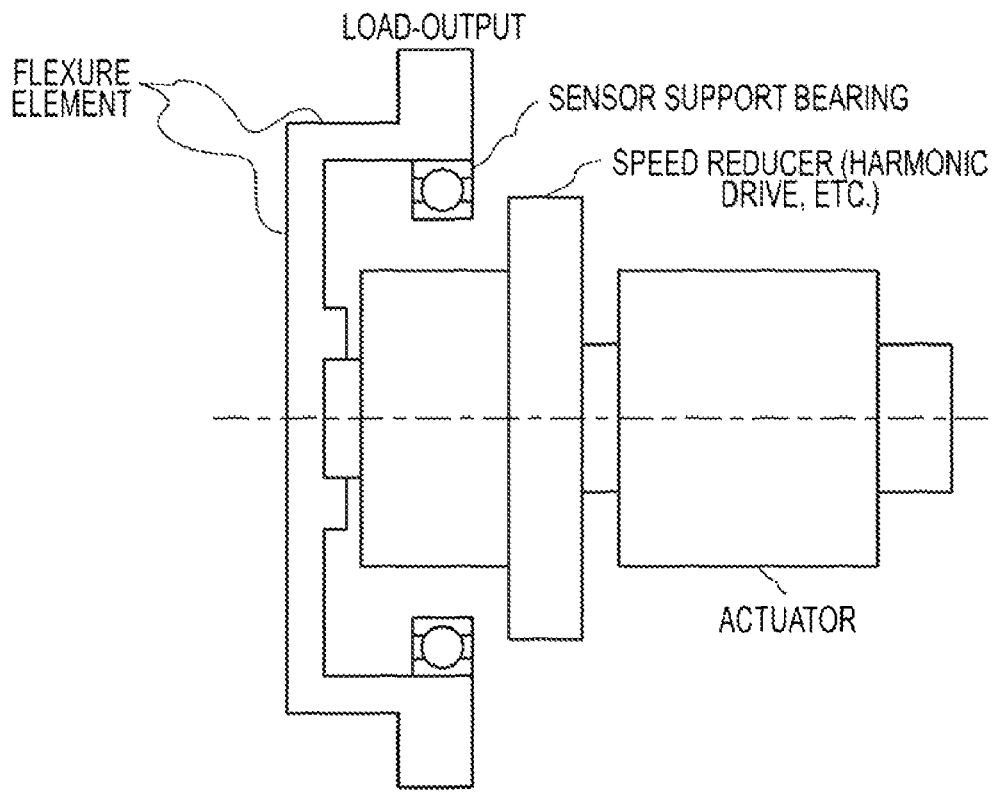
FIG. 2 is a view showing a modified example of a torque sensor (flexure element) in the drive system shown in FIG. 1.

Alternatively, as another shape of the flexure element, an almost cup shape as shown in FIG. 2 can also be used. In the example shown in the drawing, the inner peripheral side of the cup is supported by sensor support bearings, and a load is applied to the outer peripheral side of the cup or a torque is outputted therefrom.

A measuring method is general in which a flexure element to generate strain by the application of torque is attached, strain gauges are bonded to specified parts of the flexure element, and the torque is measured based on electric signals outputted from the strain gauges. The "flexure element" in this specification is defined as "mechanical sensor in which a structural member is made flexible to a certain degree and which measures a force (torque) from the degree of deformation thereof".

In this embodiment, the flexure element includes a main flexure part in which when torque is applied, strain is generated only in the application direction thereof. At least one pair of strain gauges are bonded to the main flexure part as stated above, so that torque measurement with high accuracy and high sensitivity is realized. As described later, the flexure element includes an auxiliary flexure part which is adjacent to the main flexure part and removes a displacement component other than the displacement of the main flexure part around the output shaft, and the main flexure part can be kept so that strain in a direction other than the expected direction is not generated.

The torque sensor includes the flexure element and at least one pair of strain gauges, and its structure and operation principle will be described in detail below. Incidentally, as a device to convert strain generated in the flexure element into electric signals, a photointerrupter or the like can be mentioned in addition to the strain gauge.

Figure 3:
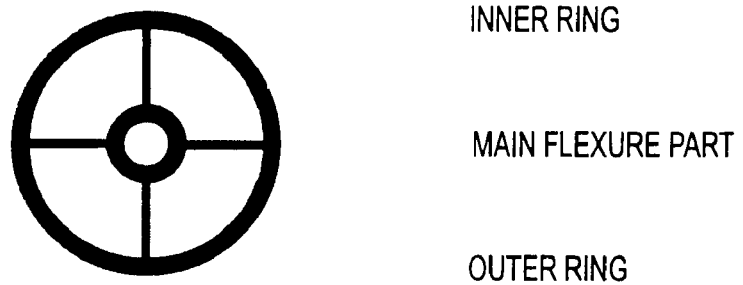
FIG. 3 is a front view of a basic shape of a flexure element (a view seen in a rotation axis direction of an actuator).

FIG. 3 is a front view (view seen in a rotation axis direction of an actuator) of a basic shape of a flexure element. In both of FIG. 1 and FIG. 2, the flexure element includes an inner ring fixed to the output shaft of the speed reducer, an outer ring to which load torque is applied or which outputs torque, and plural beams to connect both the rings at plural places so that the inner ring and the outer ring are almost concentric with each other. As shown in FIG. 3, a group of these beams almost radially extend from the center of the output shaft, and two (one pair) beams are opposite to each other. Each of the beams is not required to have a function as a structure, but causes minute deformation, that is, strain (corresponding to distortion of the beam) around the output shaft in accordance with the load torque from the outer ring, and it functions as a main flexure part.

Besides, although omitted in FIG. 3, an auxiliary flexure part is formed at least one end of the beam as the main flexure part. When load torque is generated at the outer ring side, and the main flexure part causes the minute deformation by this, the auxiliary flexure part itself is deformed and functions to remove a displacement component other than the displacement of the main flexure part around the output shaft.

Incidentally, although FIG. 1 and FIG. 2 show structural examples in which the inner ring of the flexure element is connected to the speed reducer, and the outer ring is connected to the output shaft, either of the inner ring and the outer ring may be connected to each of the output shaft and the speed reducer.

The flexure element shown in FIG. 3 includes the plural beams extending radially from the inner ring to the outer ring, and among these, two (one pair) beams opposite to each other across the output shaft are used as main flexure parts to which strain gauges are bonded. Specifically, as shown in FIG. 4, a pair of strain gauges are disposed on both side surfaces of each of the beams directed in the rotation direction of the output shaft (in other words, both side surfaces opposite to each other except side surfaces orthogonal to the output shaft), and two such pairs are bridge-connected to construct a four-gage bridge.

Figure 4:
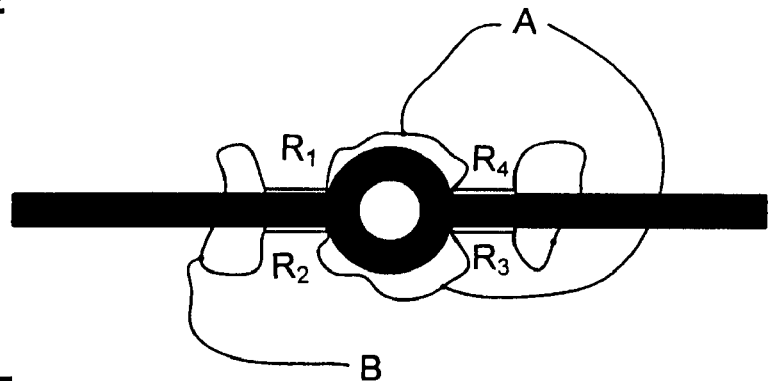
FIG. 4 is a view showing a state in which a pair of strain gauges are bonded to both sides of each of main flexure parts including a pair of beams, and are bridge-connected to construct a four-gage method.

As shown in FIG. 4, the beams opposite to each other across the output shaft are used as the main flexure parts, that is, the four-gage bridge is formed to be axially symmetric. Thus, even if the beam extends due to a problem such as eccentricity of the output shaft, the sensor system can be constructed in which the influence is cancelled.

In FIG. 4, electric resistance values of a pair of strain gauges bonded to both sides of one beam (main flexure part) relative to the output shaft are made $R_1$ and $R_2$, electric resistance values of a pair of strain gauges bonded to both sides of the other beam (main flexure part) are made $R_3$ and $R_4$, and a circuit in which the resistors $R_1$ and $R_4$ bonded to the sides of the respective beams in the same direction are connected in series is connected in parallel to a circuit in which the resistors $R_2$ and $R_3$ bonded to the opposite sides are connected in series.

Figure 5:
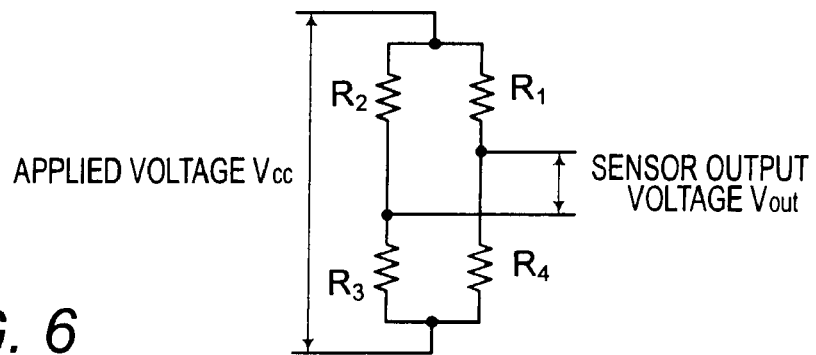
FIG. 5 is a view showing an equivalent circuit of the four-gage method shown in FIG. 4.

FIG. 5 shows an equivalent circuit of a four-gage method. When torque is applied to the flexure element from the outer periphery, and strain (distortion of the beam) is generated in each of the main flexure parts, the respective strain gauges are also minutely deformed, and the respective resistance values are changed according to the deformation amounts. When voltage $V_{cc}$ is applied to both ends B where the resistor groups are connected in parallel to each other, a potential difference $V_{out}$ appearing between intermediate points of the respective resistor groups is the sensor output of the torque sensor.

A basic expression relating to the four-gage bridge shown in FIG. 4 and FIG. 5 will be described.

In the equivalent circuit shown in FIG. 5, a relation represented by following expression (1) is established between the applied voltage $V_{cc}$ and the sensor output voltage $V_{out}$.

$$V_{out} = V_{cc}\left(\frac{R_1}{R_1 + R_4} - \frac{R_3}{R_2 + R_3}\right) \quad (1)$$

For example, it is assumed that torque is applied to the output shaft clockwise in the paper plane of FIG. 4. When a resistance change in an ith strain gauge due to a minute deformation by the torque application is $\Delta R_i$, the sensor output voltage obtained when the torque is applied is expressed by following expression (2).

$$V_{out} = V_{cc}\left(\frac{R_1 + \Delta R_1}{R_1 + \Delta R_1 + R_4 + \Delta R_4} - \frac{R_3 + \Delta R_3}{R_2 + \Delta R_2 + R_3 + \Delta R_3}\right) \quad (2)$$

In general, since the same lot is used for the strain gauges, it can be assumed that initial resistances are equal to each other, that is, following expression (3) is established.

$$R_1 = R_2 = R_3 = R_4 = R_c \quad (3)$$

Accordingly, the sensor output voltage $V_{out}$ obtained when the torque is applied, which is represented by the above expression (2), can be modified as following expression (4).

$$V_{out} = V_{cc}\left(\frac{R_c + \Delta R_1}{R_c + \Delta R_1 + R_c + \Delta R_4} - \frac{R_c + \Delta R_3}{R_c + \Delta R_2 + R_c + \Delta R_3}\right) \quad (4)$$

$$= V_{cc}\left(\frac{R_c + \Delta R_1}{2R_c + \Delta R_1 + \Delta R_4} - \frac{R_c + \Delta R_3}{2R_c + \Delta R_2 + \Delta R_3}\right)$$

When the measuring method of the four-gage method as described above is adopted, in order to perform measurement with excellent sensitivity and high accuracy, the inventors consider it desirable that in FIG. 4, the strain gauges ($R_1$ and $R_3$, $R_2$ and $R_4$) disposed diagonally across the output shaft exhibit the same behavior, and the strain gauges opposite to each other across the beam have changes the absolute values of which are the same, and the negative and positive signs of which are different, that is, the torque sensor is designed such that the respective strain gauges are arranged to establish following expression (5).

$$\Delta R_1 = -\Delta R_2 = \Delta R_3 = -\Delta R_4 = R_{st} \quad (5)$$

As stated above, when the desirable design is adopted and the above expression (5) is established, the above expression (4) to represent the sensor output voltage $V_{out}$ can be further modified as indicated by following expression (6).

$$V_{out} = V_{cc}\left(\frac{R_c + \Delta R_{st}}{2R_c + \Delta R_{st} - \Delta R_{st}} - \frac{R_c + \Delta R_3}{2R_c - \Delta R_{st} + \Delta R_{st}}\right) \quad (6)$$

$$= V_{cc}\left(\frac{R_c + \Delta R_{st}}{2R_c} - \frac{R_c + \Delta R_{st}}{2R_c}\right) = V_{cc}\frac{\Delta R_{st}}{R_c}$$

From the above expression (6), the voltage equivalent to the change of the resistance of the strain gauge due to the deformation of the beam (main flexure part) caused by the applied torque is extracted as the sensor output voltage $V_{out}$. Since the electric resistance value of the strain gauge is changed linearly or in proportion according to the strain amount, the sensor output voltage $V_{out}$ can be treated as being proportional to the strain. That is, the sensor output voltage $V_{out}$ proportional to the torque can be obtained.

When an auxiliary flexure part is disposed at one end of a beam as a main flexure part, when torque around the output shaft is applied to the flexure element, it can be grasped that the strain of the main flexure part performs the behavior close to the deformation of a simple cantilever beam.

Figure 6:
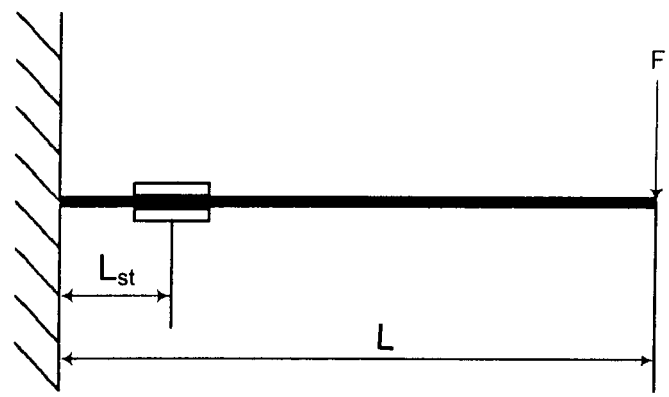
FIG. 6 is a view showing a state in which force F is applied to a free end of a simple cantilever beam of length L.

FIG. 6 shows a state where force F is applied to a free end of a simple cantilever beam of length L. In the illustrated simple cantilever beam, a pair of strain gauges opposite to each other are bonded to the upper and lower surfaces at a position of distance $L_{st}$ from the fixed end.

The distortion of the illustrated simple cantilever beam is a simple statically-determinate problem, and a relation between moment $M_i$ and stress $\rho_i$ in a material at a distance $x_i$ from the free end (x-axis is set in the paper plane horizontal direction, and i is a serial number of a sample point) is as indicated by following expression (7). Where, I in the expression denotes a geometrical moment of inertia.

$$\sigma_i = \frac{M_i}{I} = \frac{Fx}{I} \quad (7)$$

From the above expression (7), the stress at the position of the strain gauge is represented by following expression (8).

$$\sigma_{st} = \frac{F(L - L_{st})}{I} \quad (8)$$

Incidentally, when the thickness of the section of the beam is h, and the width is b, the geometrical moment of inertia in the above expressions (7) and (8) is represented by following expression (9).

$$I = \frac{bh^3}{12} \quad (9)$$

From the expression (8), the strain $\epsilon_{st}$ generated at the place where the strain gauge is bonded is represented by following expression (10) by Hooke's law. Where, E in the expression denotes Young's modulus.

$$\epsilon_{st} = \frac{\sigma_{st}}{E} = \frac{F(L - L_{st})}{EI} \qquad (10)$$

As already described, the strain of the strain gauge is proportional to the resistance change, and the sensor output voltage $V_{out}$ based on the four-gage method can be treated as being proportional to the torque. That is, following expression (11) is established.

$$V_{out} \propto C_{st}\epsilon_{st} \qquad (11)$$

Constant $C_{st}$ in the above expression denotes a strain gauge ratio. Although the strain gauge ratio $C_{st}$ varies for respective strain gauge products, it is generally a value of about 2.1.

Return is made to FIG. 3. Although the main flexure part extends from the inner ring to the outer ring in the radius direction, when the auxiliary flexure part is disposed at the contact portion between the main flexure part and the outer ring, and when it is assumed that the displacement of the contact portion is minute, the main flexure part can be considered to be a cantilever beam in which the inner ring side is the fixed end, and it can be assumed that two cantilever beams are opposite to each other across the output shaft.

The flexure element shown in FIG. 3 has the four beams. Two (one pair) beams opposite to each other across the output shaft are made the main flexure parts, the strain gauges are disposed at both sides of these beams, and two such pairs are bridge-connected to construct the four-gage bridge (see FIG. 4). Thus, even when the beam is extended by a problem such as eccentricity of the output shaft, the sensor system in which the influence is cancelled can be constructed (described before). Because, even when the center shafts of the inner ring and the outer ring are shifted in the longitudinal direction of the beam or in the direction orthogonal thereto and they do not become concentric with each other, since the resistance ratio of the opposite resistors of the bridge in the direction orthogonal to the shift direction is not changed, the sensor output voltage $V_{out}$ is not consequently changed.

FIGS. 7A to 7D show a sensor output voltage with respect to a deformed state of a beam in a four-gage bridge (see FIG. 4) constructed by connecting strain gauges bonded to both sides of a pair of beams opposite to each other across the output shaft.

Figure 7A:
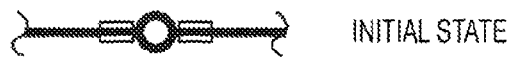
FIG. 7A is a view for explaining a sensor output voltage with respect to a deformed state of a beam in a four-gage bridge (see FIG. 4) constructed by connecting strain gauges bonded to both sides of a pair of beams opposite to each other across an output shaft, and specifically shows an initial state in which no torque is applied.

FIG. 7A shows an initial state where no torque is applied, each beam is not deformed, and an inner ring (output shaft) is positioned almost at the center.

Figure 7B:
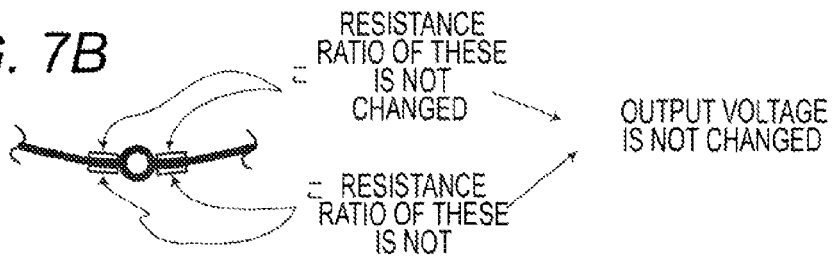
FIG. 7B is a view for explaining the sensor output voltage with respect to the deformed state of the beam in the four-gage bridge (see FIG. 4) constructed by connecting the strain gauges bonded to both sides of the pair of beams opposite to each other across the output shaft, and specifically shows a state in which the output shaft becomes eccentric in a direction orthogonal to the longitudinal direction of both the beams.

FIG. 7B shows a state where the output shaft becomes eccentric in a direction orthogonal to the longitudinal direction (lower direction of the paper plane) of both beams. In this case, since the resistance ratio of the strain gauges ($R_1$ and $R_4$, $R_2$ and $R_3$) bonded to one side of each of the beams is not changed, the sensor output voltage $V_{out}$ is not also changed. Thus, the eccentricity of the output shaft is not erroneously detected as the torque.

Figure 7C:
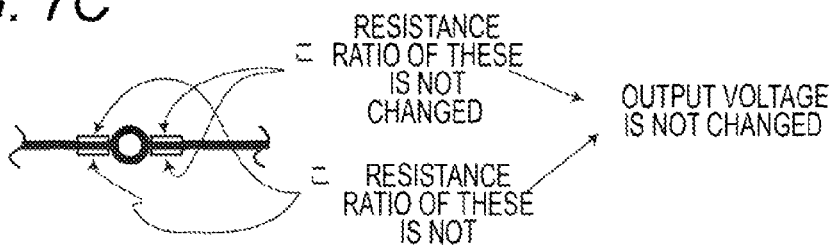
FIG. 7C is a view for explaining the sensor output voltage with respect to the deformed state of the beam in the four-gage bridge (see FIG. 4) constructed by connecting the strain gauges bonded to both sides of the pair of beams opposite to each other across the output shaft, and specifically shows a state in which the output shaft becomes eccentric in the longitudinal direction of both the beams.

FIG. 7C shows a state where the output shaft becomes eccentric in the longitudinal direction (left direction in the paper plane) of both the beams. In this case, since the resistance ratio of the strain gauges ($R_1$ and $R_2$, $R_3$ and $R_4$) bonded to both sides in each of the beams is not changed, the sensor output voltage $V_{out}$ is not also changed. Thus, the eccentricity of the output shaft is not erroneously detected as the torque.

Figure 7D:
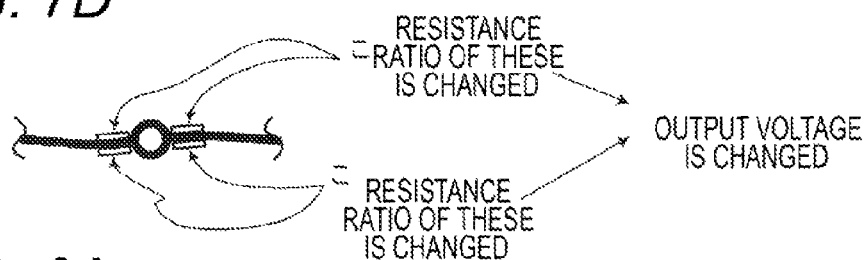
FIG. 7D is a view for explaining the sensor output voltage with respect to the deformed state of the beam in the four-gage bridge (see FIG. 4) constructed by connecting the strain gauges bonded to both sides of the pair of beams opposite to each other across the output shaft, and specifically shows a state in which distortion occurs at both the beams by the application of torque around the output shaft.

On the other hand, FIG. 7D shows a state where distortion is generated in both the beams by the application of torque around the output shaft (counterclockwise direction in the paper plane). In this case, as represented by the expression (11), the sensor output voltage $V_{out}$ corresponding to the strain $\epsilon_{st}$ at the part of the beam where the strain gauges are bonded can be obtained.

In summary, in the four-gage bridge shown in FIG. 4, the sensor output voltage $V_{out}$ is outputted only when the torque is applied to the inner ring center. That is, according to the wire connection method of the strain gauges as shown in FIG. 4 an FIG. 5, only the deformation of the main flexure part corresponding to the distortion (see FIG. 6), by the torque, of the two cantilever beams disposed to be opposite to each other across the output shaft can be extracted as the sensor output voltage $V_{out}$.

From FIGS. 7A to 7D, as relatively excellent conditions in the design state of the flexure element shown in FIG. 3, the following can be mentioned.

(1) Both the inner ring and the outer ring are held at high accuracy by bearings with sufficient rigidity.

(2) The relative position accuracy of the position of the center (output shaft) is high in any rotation angle of the inner ring and the outer ring.

(3) Other unnecessary moment, translation force and the like are not applied to the beam (main flexure part).

In the description up to here, the auxiliary flexure part is disposed at one end of the beam as the main flexure part, and it is assumed that the strain of the main flexure part obtained when the torque around the output shaft is applied exhibits the behavior close to the distortion of the simple cantilever beam (see FIG. 6). On the other hand, when both ends of the main flexure part are directly attached to the inner ring and the outer ring without the auxiliary flexure part, the strain of the main flexure part obtained when the torque around the output shaft is applied exhibits the behavior close to the distortion of the both-end fixed beam.

Figure 8A:
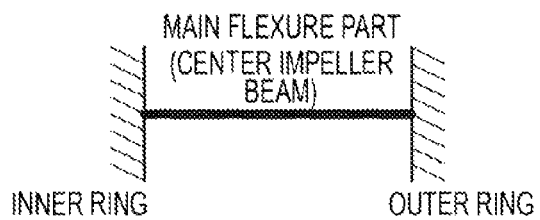
FIG. 8A is a view showing a state in which both ends of one beam (main flexure part) are supported by an inner ring and an outer ring.
Figure 8B:
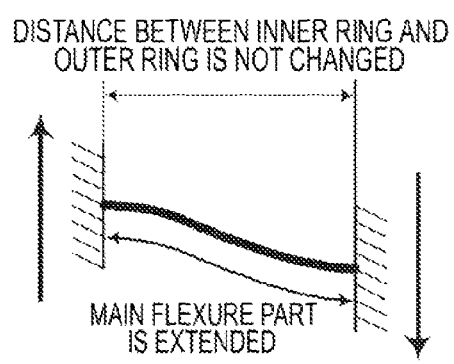
FIG. 8B is a view showing a state in which torque around an output shaft is applied to a flexure element and the beam (main flexure part) both ends of which are supported is distorted.

FIG. 8A shows a state where both ends of one beam (main flexure part) are supported by the inner ring and the outer ring. The inner ring and the outer ring have sufficiently high rigidity, and both ends of the main flexure part are fixed ends. Here, when torque around the output shaft is applied to the flexure element, as shown in FIG. 8B, the inner ring and the outer ring are moved in up and down opposite directions on the paper plane. Since the distance between the inner ring and the outer ring is kept, the main flexure part behaves as the both-end fixed beam while being slightly extended, and is distorted as shown in the drawing.

Figure 9:
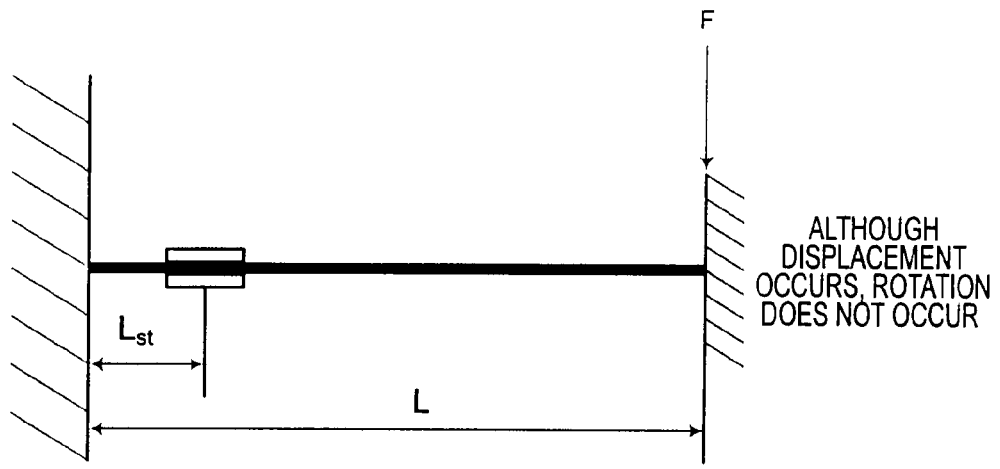
FIG. 9 is a view showing a state in which force F is applied to one end of a both-end fixed beam of length L.

FIG. 9 shows a state where force F is applied to one end of the both-end fixed beam of length L. A pair of strain gauges opposite to each other are bonded to both the upper and lower surfaces of the illustrated both-end fixed beam at a position of distance $L_{st}$ from the fixed end. Since the end of the beam to which the force F is applied is the fixed end, as shown in FIG. 8B, although the displacement occurs, the rotation does not occur. Besides, as described above, although the beam is slightly extended, when it is assumed that all the strain gauges are uniformly extended, there is no problem in principle.

When the main flexure part behaves as the simple cantilever beam (see FIG. 6), the strain $\epsilon_{st}$ generated at the place where the strain gauges are bonded is as represented by the above expression (10). On the other hand, when the main flexure part behaves as the both-end fixed beam as shown in FIG. 9, the spring constant (Young's modulus) is four times larger than that of the cantilever beam of the same length, and therefore, the strain $\epsilon_{st}$ generated at the place where the strain gauges are bonded is represented by following expression (12). However, since there is symmetry, only the expression in the left half of the paper plane of FIG. 9 is indicated here.

$$\varepsilon_{st} = \frac{\sigma_{st}}{E} = \frac{FL}{4EI} \quad (12)$$

When both ends of the main flexure part are connected to the inner ring and the outer ring without the auxiliary flexure part, when torque is applied, the behavior becomes as shown in FIG. 8A to FIG. 9. In principle, the torque can be detected from the sensor output voltage $V_{out}$ caused by resistance change $\Delta R_{st}$ corresponding to the strain $\varepsilon_{st}$ represented by the above expression (12) from the respective strain gauges. Even when the main flexure part behaves as the both-end fixed beam, not the simple cantilever beam, there is no problem from the viewpoint that the torque can be detected. However, the sensitivity of the sensor is lowered. As is understood from the comparison between the expression (10) and the expression (12), when the flexure element is constructed without the auxiliary flexure part, the spring constant of the beam becomes four times larger, and the sensitivity of the sensor is lowered to ¼.

Figure 10:
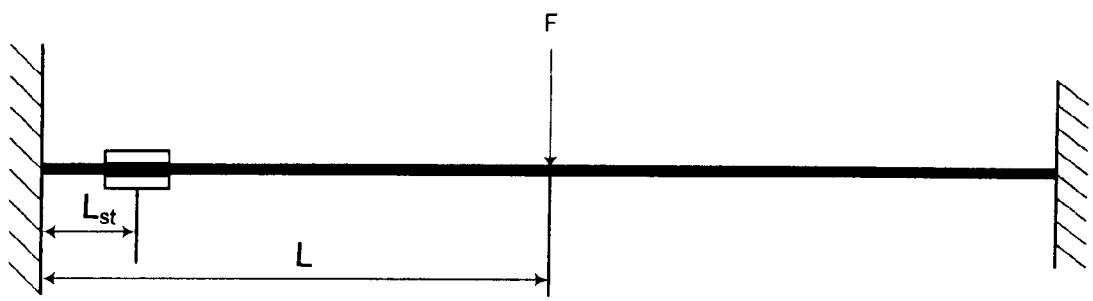
FIG. 10 is a view showing a model of modification of FIG. 9 and specifically shows a state in which force F is applied to the center of a both-end fixed beam which has length 2L and is symmetrical with respect to the center.

Here, a supplemental description will be given to the method of deriving the above expression (12). The model shown in FIG. 9 is deformed like the both-end fixed beam as shown in FIG. 10. The drawing is horizontally symmetric with respect to the center. The distances from both ends of the both-end fixed beam to the barycenter are made a and b, and a=b=L is established from the symmetry. Incidentally, when it is considered that the deformation shown in FIG. 8B is supported symmetrically from both sides, since the system shown in FIG. 10 is equivalent to a case where half force is applied, an expression of moment as represented by following expression (13) is derived.

$$\begin{aligned} M_i &= -\frac{Wb^2}{l^3}\{(3a+b)x - al\} \\ &= -\frac{(2F)(2L/2)^2}{(2L)^3}\{(3L+L)x - L \cdot 2L\} \\ &= \frac{F}{8}(2L - 4L_{st}) \end{aligned} \quad (13)$$

The stress is calculated from the above expression (13), and when it is assumed that the strain gauges are close to the end of the beam, it is understood that the spring has the rigidity four times higher than that of the cantilever beam.

$$\sigma_i = \frac{M_i}{I} = \frac{F}{8I}(2L - 4L_{st}) \quad (14)$$

$$\varepsilon_{st} = \frac{\sigma_{st}}{E} = \frac{F(L - L_{st})}{4EI}$$

Incidentally, when it is assumed that when torque is applied, the beam is only minutely extended and all the strain gauges are uniformly extended, there is no problem in principle. However, when the deformation becomes large, the deformation deviates from the deformation amount suitable for the above measuring method.

Figure 11:
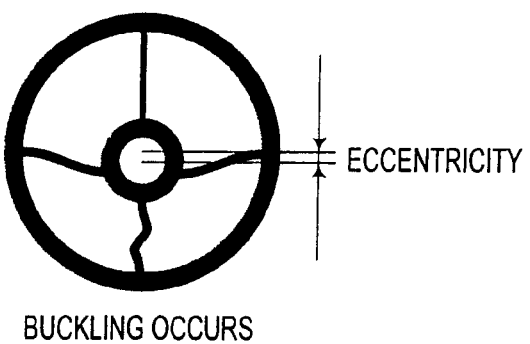
FIG. 11 is a view showing a state in which a beam of a flexure element is buckled.

When the torque sensor is attached to an actuator drive control system of a robot or a haptic device and is actually used, an ideal state is not necessarily obtained due to the limitation of mechanism capacity or the like. Due to backlash, size tolerance or the like of bearings, there can occur that the deformation of the flexure element becomes a level which cannot be neglected. When the deformation of the flexure element is simple compression, the deformation of the main flexure part can be modeled as the deformation of the simple cantilever beam or the both-end fixed beam (expression (10) or (12)). However, as shown in FIG. 11, when the beam is buckled, it is difficult to model the behavior, and it may become impossible to measure the torque. When the beam is buckled at its root, in case it is not known to which side the beam is bent with respect to the longitudinal direction of the beam, it may be impossible to negate the possibility that a large influence is exerted on the measurement result.

Figure 12:
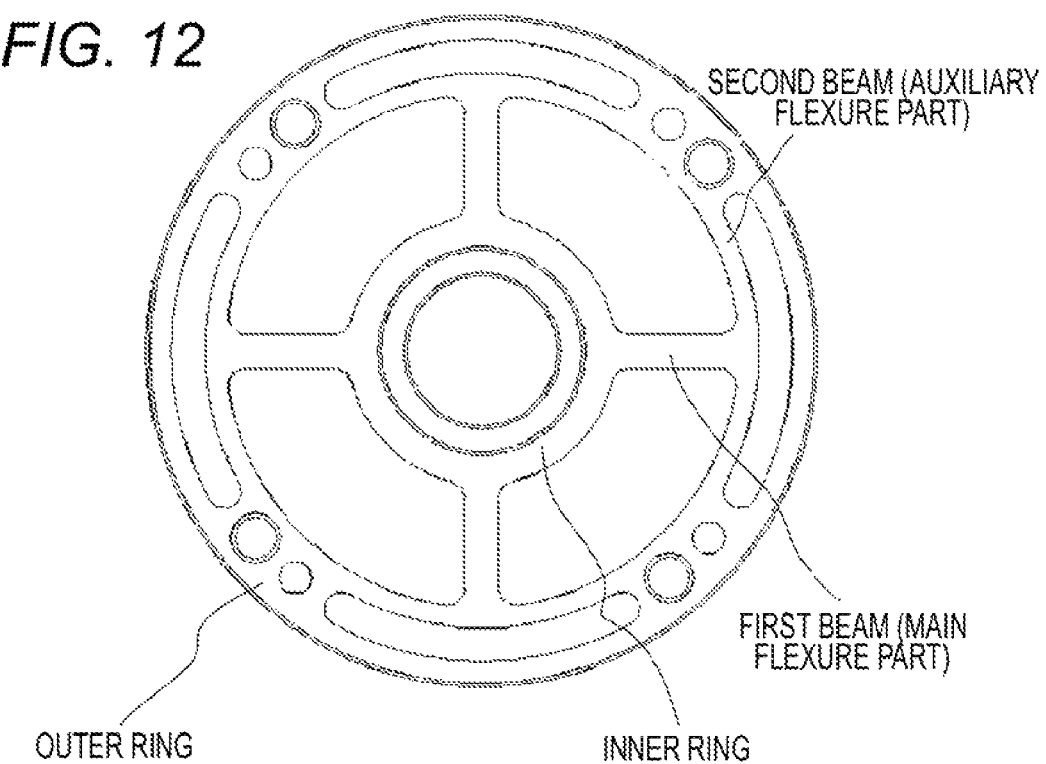
FIG. 12 is a view showing a specific structural example (front view) of a flexure element.

FIG. 12 shows a specific structural example (front view) of a flexure element. The illustrated flexure element includes an inner ring and an outer ring both of which have sufficient rigidity, first beams radially arranged to support the inner ring and the outer ring concentrically, and second beams perpendicularly connected to the ends of the first beams where the first beams cross the outer ring. The first beam is the main flexure part for obtaining the strain which is easily modeled at the time of torque application (that is, the main beam for torque measurement). On the other hand, the second beam is the auxiliary flexure part which is designed to be relatively flexible.

As already described with reference to FIG. 6 to FIG. 7D, in the torque measurement, it is conceivable to be desirable that the main flexure part exhibits the behavior as close to the simple cantilever beam as possible. For that purpose, it is necessary that when the torque around the output shaft is applied to the flexure element (or between the inner ring and the outer ring), only the bending is transmitted to the main flexure part, and unnecessary extension or moment at the end is made not to act.

Figure 13A:
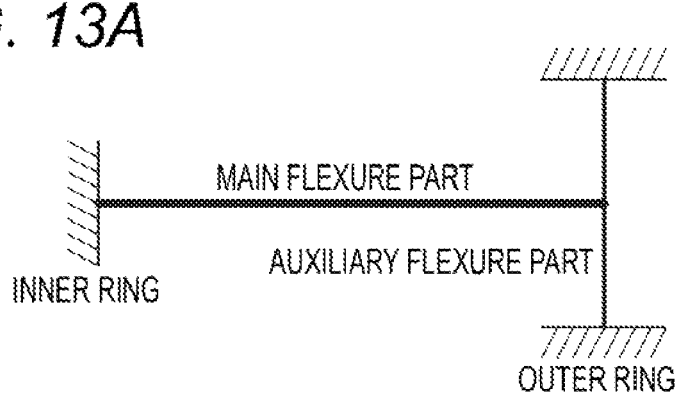
FIG. 13A is a view simply showing a state in which one end of a main flexure part is supported by an inner ring and the other end is supported by an auxiliary flexure part.
Figure 13B:
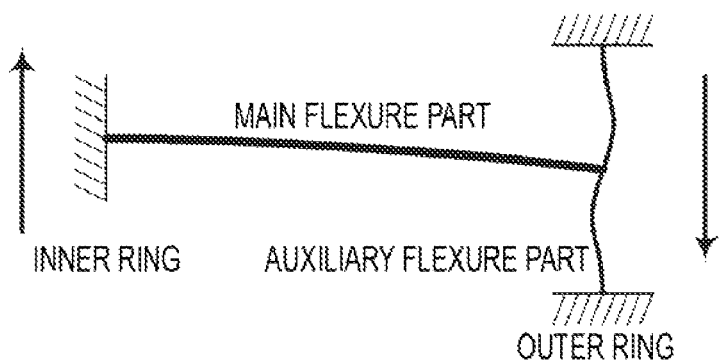
FIG. 13B is a view showing the behaviors of the main flexure part and the auxiliary flexure part when torque around an output shaft is applied.

FIG. 13A simply shows a state where one end of one main flexure part is supported by an inner ring and the other end is supported by an auxiliary flexure part. FIG. 13B shows the behavior of the main flexure part and the auxiliary flexure part when the torque around the output shaft is applied. The support end of the main flexure part by the inner ring is the fixed end, and rotation does not occur. On the other hand, the auxiliary flexure part is designed to be relatively flexible (described before), and when the torque is applied, it is bent as shown in the drawing.

For example, when the torque is applied from the outer ring, the torque is applied to the inner ring side to resist it, and the beam as the main flexure part is deformed. However, at that time, although the beam is extended in the radius direction (length direction of the beam), the auxiliary flexure part functions to decrease the extension. As a result, only bending is transmitted to the main flexure part, and unnecessary extension or moment at the tip end does not act. Thus, the main flexure part exhibits the behavior closest to the simple cantilever beam.

The auxiliary flexure part cancels an eccentric component of the inner ring and the outer ring with respect to the output shaft, and cancels the extension of the main flexure part in the radius direction at the time of torque application. As a result, when the torque is applied, the main flexure part exhibits the behavior close to the simple cantilever beam which is easily modeled, and the sensitivity to the unnecessary moment or force becomes low. Besides, as is understood from FIG. 13B, since the deformation of the simple cantilever beam becomes large toward the root, the sensitivity of the sensor is raised by bonding the strain gauges to a place of the main flexure part close to the inner ring.

It should be understood that consideration is given to the flexure element shown in FIG. 12 so that the main flexure part functions as the simple cantilever beam to the utmost, and the other surplus force and moment are not applied as much as possible. FIG. 13B shows, in plane development, the behavior when the torque is applied relatively between the inner ring and the outer ring. There are effects that the unnecessary moment is released at the contact part of the main flexure part by the suitable deformation of the auxiliary flexure part, and the displacement of the beam in the axial direction is absorbed by the deformation of the main flexure part.

That is, it can be said that the flexure element shown in FIG. 12 has relatively excellent conditions (described before) in the following design state of the flexure element.

(1) Both the inner ring and the outer ring are held with high accuracy by bearings having sufficient rigidity.

(2) The relative position accuracy of the position of the center (output shaft) is high at any rotation angle of the inner ring and the outer ring.

(3) Other unnecessary moment, translation force and the like are not applied to the beam (main flexure part).

Figure 14A:
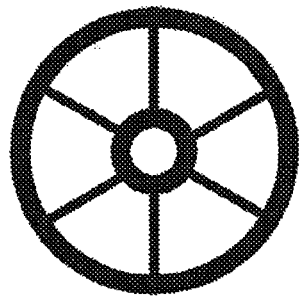
FIG. 14A is a view showing a structural example of a flexure element in which the number of constitution beams to couple an inner ring and an outer ring is made 3.
Figure 14B:
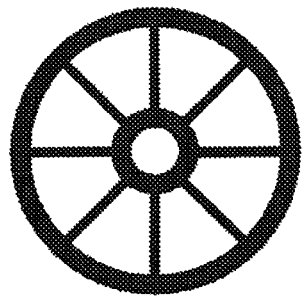
FIG. 14B is a view showing a structural example of a flexure element in which the number of constitution beams to couple an inner ring and an outer ring is made 4.

Incidentally, when the four-gage bridge shown in FIG. 4 and FIG. 5 is constructed, it is desirable that the inner ring and the outer ring are coupled by at least two pairs of beams, or when the mechanical balance is considered, by three or more pairs of beams (main flexure parts). FIG. 14A and FIG. 14B show structural examples of flexure elements in which the constitution number of beams to couple the inner ring and the outer ring is made 3 or 4. Besides, it is conceivable that when the constitution number of beams to couple the inner ring and the outer ring is changed, the number of strain gauges constituting the bridge circuit to obtain the sensor output voltage is also increased, and the measurement accuracy is improved.

Besides, the minute deformation of the main flexure part can be measured by the strain gauge or a photointerrupter. Alternatively, when the limitation of the space or the like in the actuator unit allows, any device to measure the minute displacement using, for example, a tuning fork can be applied.

Figure 15:
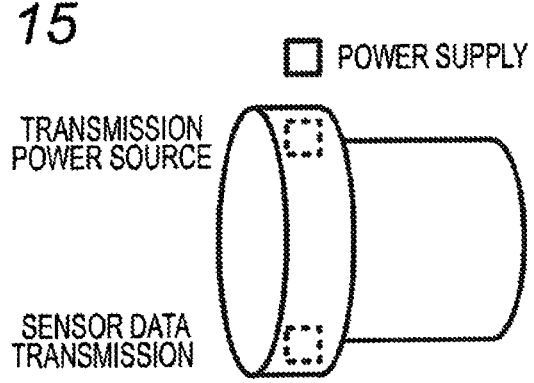
FIG. 15 is a view showing a method of transmitting measurement data of a torque sensor to the outside by wireless or an optical device.
Figure 16:
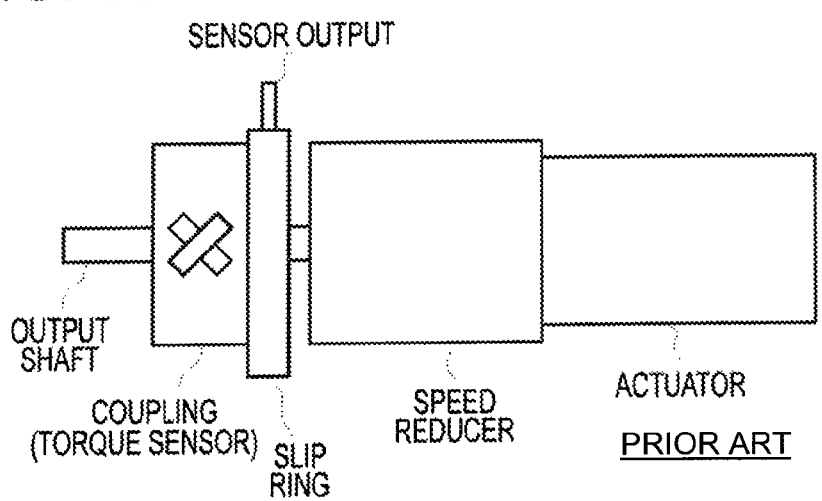
FIG. 16 is a view showing a general structural example for measuring an output torque of an actuator motor.
Figure 17:
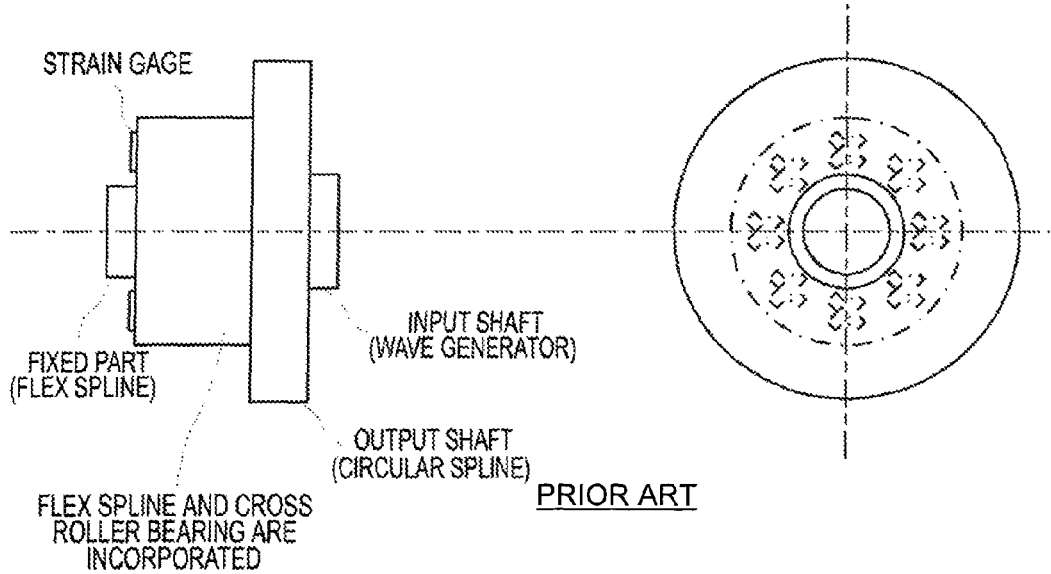
FIG. 17 is a view for explaining a torque detection method in a harmonic drive mechanism.
Figure 18:
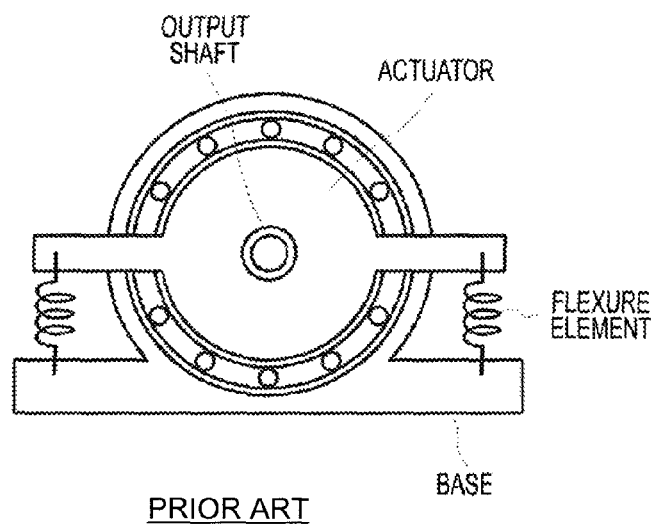
FIG. 18 is a principle view of a float differential torque measuring apparatus.

When an output arm to which the torque sensor is attached has a finite rotation angle, the operation is sufficiently possible. When a high point is requested by infinite rotation or further using a speed reducing device, there is a fear that a wiring for extracting a sensor output is twisted. In the latter case, a method of transmitting measurement data to the outside by wireless or an optical device may be used (see FIG. 15). Incidentally, when electric power is required for transmission of data, a battery is used, or electric power is supplied from the outside by electromagnetic induction or the like.

Up to here, the present invention is described in detail with reference to the specific embodiment. However, it would be apparent for one of ordinary skill in the art that the embodiment can be changed or modified within the scope not departing from the gist of the invention.

When the torque measuring apparatus of the embodiment of the invention is attached to the output shaft of a speed reducer excellent in backdrivability such as a harmonic drive speed reducer typified by, for example, Harmonic Drive (registered trademark), more excellent characteristics can be obtained. However, the gist of the invention is not limited to this. Even when the torque measuring apparatus of the embodiment of the invention is attached to the output shaft of a speed reducer poor in backdrivability, it can be sufficiently used. Alternatively, the torque measuring apparatus of the embodiment of the invention can also be applied to a driving apparatus, such as a direct drive motor, which uses a speed reducer and can output a sufficient torque by a single motor.

That is, the torque measuring apparatus of the embodiment of the invention can operate independently of the backdrivability.

Since the torque measuring apparatus of the embodiment of the invention performs measurement at the side closer to the load than the actuator or the speed reducer, the characteristic of the load itself is easily measured. In other words, the influence of components of the drive mechanism is suppressed, the torque measurement with high sensitivity can be realized, and a signal of high band can also be sufficiently measured. That is, the torque measuring apparatus of the embodiment of the invention can perform the torque measurement closer to the load.

By the torque control, the control characteristic of the actuator can be improved such that the target value of the force to be applied to the working object is directly received, and the force represented by the target value is realized. On the other hand, when the performance of the sensor system or the drive control system is not sufficient, it may become a very dangerous system. According to the invention, since the simple and high accuracy sensor system can be constructed, the detection of an overload or the like is easy, and the safe torque control system can be realized.

In the actuator drive control system, the torque measuring apparatus of the embodiment of the invention is not only incorporated in a simple torque minor loop, but also can be actively used. That is, the control system to perform fine dynamics computation can be realized by reflecting high sensitivity and wide band measurement data obtained from the torque measuring apparatus of the embodiment of the invention. In other words, the simulation accuracy is improved by using the torque measuring apparatus of the embodiment of the invention.

When the torque measuring apparatus of the embodiment of the invention is incorporated in the simple torque minor loop of the actuator drive control system, it is sufficient if the band of the sensor system is merely better than the responsibility of the actuator. On the other hand, in the dynamics computation, for example, the state just before the contact is determined by using higher computation, so that optimization of start, reduction of contact force, improvement of energy efficiency, and the like are obtained, that is, the algorithm and control strategy, together with the characteristic of the control system, can be improved. That is, foreseeing control in the actuator driving control system can be improved by using the torque measuring apparatus of the embodiment of the invention.

Besides, in the actuator drive control system of the haptic device to exhibit the sense of force or the sense of touch under a virtual environment, the torque measuring apparatus of the embodiment of the invention is used, and the control algorithm is devised, so that an arbitrary characteristic different from an actual control model is calculated, and the control output to cause the exact virtual behavior becomes possible. For example, even if a load has no viscosity, the computation can be performed so that the movement is performed as if the load has the viscosity, or the control can be performed to perform the behavior different from the weight (inertia moment) of the load. In order to realize a virtual physical model, it can be said that the simple and highly sensitive sensor system is constructed by using the torque measuring apparatus of the embodiment of the invention.

The torque measuring apparatus of the embodiment of the invention is basically constructed by bonding plural pairs of strain gauges to specified parts of the flexure element having a high degree of design freedom. Thus, a compact mechanism system for an introduction object such as an output shaft of an actuator or a speed reducer can be designed. Especially, since the whole length of the actuator drive control system in the rotation axis direction can be suppressed to be short, when it is applied to, for example, an arm robot, it can be disposed as an actuator unit of a joint section as it is.

Application examples of an actuator unit to enable torque control by using the torque measuring apparatus of the embodiment of the invention will be exemplified below.

(1) Haptic Device

The haptic device is a user interface to exhibit force or torque in a virtual environment or remote control environment. The performance of feeding back the torque is improved by using the torque measuring apparatus of the embodiment of the invention, and the appropriate operation system with high presentation performance to the operator can be realized.

(2) Working Arm Mechanism

By applying the force or torque control system to a working arm mechanism such as a robot, when a copying control or a task accompanied by a touch is performed, a suitable control state can be realized. Of course, although the contact state of a holding object does not always have the reproducibility, the danger of damaging a robot main body, a working object, or a working environment can be lowered by constructing the highly sensitive sensor system using the torque measuring apparatus of the embodiment of the invention. Besides, when such a robot is used for, for example, a production equipment, an effect of raising the yield or the like can also be expected.

(3) Foot Mechanism

As an example of a moving body apparatus, a foot type can be mentioned. When it is constructed by a link mechanism like the working arm mechanism, the same effect as the above is obtained, and further, control in view of the contact state between the movement surface and the sole can be realized, and an excellent handling property to the ground can be obtained.

(4) Power Assist Mechanism

A human operation force enlarging apparatus indispensably requires a torque (or force) sensor and a torque (or force) control. When an apparatus is designed to match the physical characteristic of an operator, it is necessary that respective elements are made a unit to the utmost. It is conceivable that the actuator unit using the torque measuring apparatus of the embodiment of the invention, which is simple, small, highly sensitive, and excellent in safety, becomes very easy to be handled.

(5) Safety Apparatus

Even if the sensibility or the like of a sensor system is not sufficiently high, when the sensor system having a tough characteristic is used, a torque limiter, or collision/interference avoidance can be realized. The safety apparatus can be constructed by using the torque measuring apparatus of the embodiment of the invention.

Besides, in the present specification, although the description is mainly given to the embodiment using the strain gauge as the device to convert the strain generated in the flexure element into the electric signal, the invention is not limited to this. For example, the conversion process may be performed using a photointerrupter.

In summary, the invention is disclosed in the form of exemplification, and the disclosed contents of the specification should not be interrupted in a limited way. The gist of the invention should be determined in view of the claims.

The present application contains subject matter related to that disclosed in Japanese Priority Patent Application JP 2008-143763 filed in the Japan Patent Office on May 30, 2008, the entire contents of which is hereby incorporated by reference.

It should be understood by those skilled in the art that various modifications, combinations, sub-combinations, and alterations may occur depending on design requirements and other factors insofar as they are within the scope of the appended claims or the equivalents thereof.

What is claimed is:

1. A torque measuring apparatus comprising:
a flexure element including:
an inner ring fixed to an output shaft of an actuator or a speed reducer;
an outer ring to which the load torque is applied or which outputs the torque;
a main flexure part connecting the inner ring and the outer ring, the main flexure part subjected primarily to a displacement along the angular direction according to a torque applied from the load object, and
an auxiliary flexure part formed at an end of the main flexure part by a slot disposed in a portion of a circumference of the outer ring, the auxiliary flexure part removing a displacement component of the main flexure part other than the displacement along the angular direction; and
at least one pair of strain gauges attached to the main flexure part, wherein the torque is measured based on electric signals outputted from the strain gauges in response to the displacement along the angular direction of the main flexure part.

2. The torque measuring apparatus according to claim 1, wherein when the main flexure part undergoes minute deformation due to the application of the torque, the auxiliary flexure part itself deforms to remove the displacement component of the main flexure part other than the displacement along the angular direction.

3. The torque measuring apparatus according to claim 2 further comprising a wireless device for transmitting the electrical signals to an external receiver.

4. The torque measuring apparatus according to claim 1, wherein the flexure element includes plural beams to connect both the rings at plural places to cause the inner ring and the outer ring to be almost concentric with each other, and at least a part of the beams is the main flexure part to which the strain gauges are attached.

5. The torque measuring apparatus according to claim 4, wherein a pair of beams disposed to be opposite to each other across the output shaft are the main flexure parts, and a pair of strain gauges are bonded to both sides of each of the main flexure parts directed to a rotation direction of the output shaft.

6. The torque measuring apparatus according to claim 5, wherein initial resistance values of the respective strain gauges are almost uniform, the strain gauges disposed diagonally across the output shaft exhibit similar behaviors, and absolute values of changes are equal to each other between the strain gauges opposite to each other across each of the main flexure parts.

7. The torque measuring apparatus according to claim 5, wherein the pair of strain gauges bonded to both sides of each of the main flexure parts form a four-gage bridge that cancels the influence of eccentricity between the output shaft and the load object.

8. The torque measuring apparatus according to claim 4, wherein each of the plural beams is disposed radially from the inner ring to the outer ring.

9. The torque measuring apparatus according to claim 8, wherein both ends of the each of the plural beams are fixed ends.

10. The torque measuring apparatus according to claim 4, the flexure element further comprising:

first beams radially arranged to support the inner ring and the outer ring concentrically; and second beams perpendicularly formed at the ends of the first beams where the first beams cross the outer ring.

11. The torque measuring apparatus according to claim 10, wherein the first beams comprise the main flexure part.

12. The torque measuring apparatus according to claim 10, wherein the second beams comprise the auxilliary flexure part.

13. The torque measuring apparatus according to claim 10, wherein when the outer ring is subjected to torque, the auxilliary flexure part deforms to decrease the extension in the main flexure part.

14. The torque measuring apparatus according to claim 10, wherein the strain gages are bonded on the main flexure part nearer to the inner ring.

15. An actuator drive control system comprising a torque measuring apparatus of claim 1, wherein the main flexure part of the flexure element of the torque measuring apparatus is attached to the output shaft of the actuator or the speed reducer, and torque measurement at driving of the actuator is performed.

* * * * *